US012693846B2

(12) United States Patent
Lei et al.

(10) Patent No.: US 12,693,846 B2
(45) Date of Patent: Jul. 28, 2026

(54) ITERATIVE PRIORITIZED BACKGROUND DATA TRANSFER FOR VEHICLE OVER-THE-AIR UPDATES

(71) Applicant: Ford Global Technologies, LLC, Dearborn, MI (US)

(72) Inventors: Oliver Lei, Windsor (CA); Yun Ho Lee, Pleasanton, CA (US); Jayanthi Rao, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 288 days.

(21) Appl. No.: 18/466,480

(22) Filed: Sep. 13, 2023

(65) Prior Publication Data

US 2025/0085958 A1     Mar. 13, 2025

(51) Int. Cl.
| | |
|---|---|
| *G06F 9/445* | (2018.01) |
| *G06F 8/65* | (2018.01) |
| *H04L 67/00* | (2022.01) |
| *H04L 67/10* | (2022.01) |
| *H04L 67/12* | (2022.01) |

(52) U.S. Cl.
CPC ................ *G06F 8/65* (2013.01); *H04L 67/10* (2013.01); *H04L 67/12* (2013.01); *H04L 67/34* (2013.01)

(58) Field of Classification Search
CPC .......... G06F 8/65; G06F 8/654; G06F 21/572; G06F 8/71; G06F 8/60; G06F 8/656; G06F 8/658; G06F 16/2379; H04W 4/40; H04L 67/10; H04L 67/12; H04L 67/34
See application file for complete search history.

(56) References Cited

U.S. PATENT DOCUMENTS

| | | | |
|---|---|---|---|
| 11,425,263 | B2 | 8/2022 | Karampatsis et al. |
| 11,601,849 | B2 | 3/2023 | Xin et al. |
| 11,678,252 | B2 | 6/2023 | Dao et al. |
| 2020/0022027 | A1 | 1/2020 | Iwai et al. |
| 2020/0125355 | A1* | 4/2020 | Aust ........................ H04W 4/44 |
| 2020/0371773 | A1* | 11/2020 | Kato ................. G01C 21/3885 |
| 2022/0326936 | A1* | 10/2022 | Goto ........................ G06F 8/65 |

FOREIGN PATENT DOCUMENTS

| | | |
|---|---|---|
| CN | 115589359 A | 1/2023 |
| DE | 102021125589 A1 | 4/2022 |

* cited by examiner

*Primary Examiner* — Chuck O Kendall
(74) *Attorney, Agent, or Firm* — Joseph Zane; Brooks Kushman P.C.

(57)     ABSTRACT

In a first iteration, an OTA update is initiated as a background data transfer over a communications network to a plurality of vehicles. Delivery statuses for the OTA update are received from the plurality of vehicles. A vehicle list is updated to remove the vehicles with a completed OTA update based on the delivery statuses and to set a low priority to the vehicles having poor RF status. In a subsequent iteration, a first background data transfer is initiated to send the OTA update to the vehicles on the vehicle list having high priority and then a second background data transfer is initiated to send the OTA update to the vehicles on the vehicle list having the low priority. The receiving, updating, and subsequent iteration operations are repeated until all of the vehicles have received the OTA update.

25 Claims, 5 Drawing Sheets

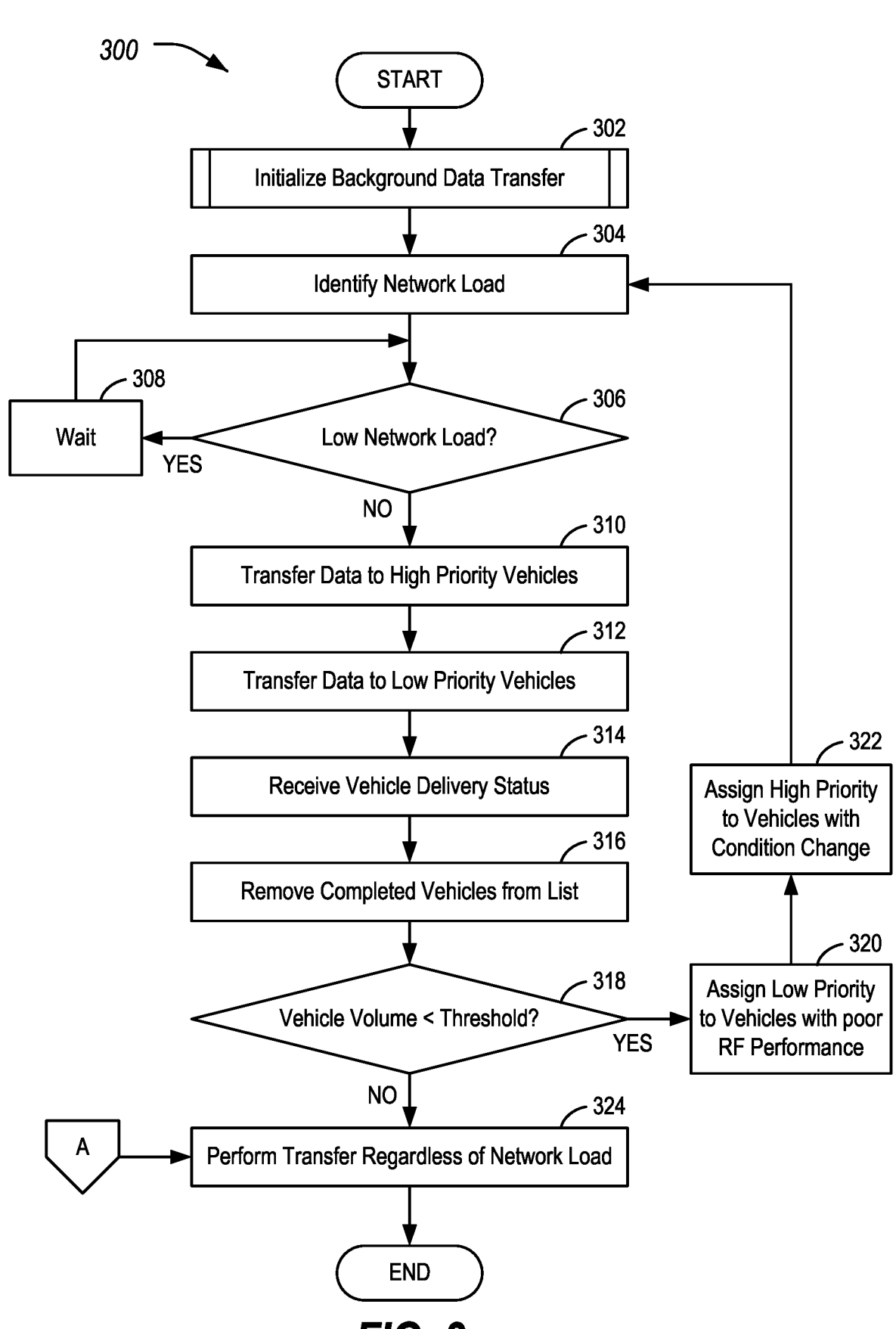

*300*

START

302
Initialize Background Data Transfer

304
Identify Network Load

306
Low Network Load?

308
Wait

YES

NO

310
Transfer Data to High Priority Vehicles

312
Transfer Data to Low Priority Vehicles

314
Receive Vehicle Delivery Status

316
Remove Completed Vehicles from List

318
Vehicle Volume < Threshold?

YES

322
Assign High Priority to Vehicles with Condition Change

320
Assign Low Priority to Vehicles with poor RF Performance

NO

A

324
Perform Transfer Regardless of Network Load

END

START

Attempt OTA Update /─402

Download Speed < Threshold? /─404

YES → Report Termination, RF Performance, Location /─406

NO

Download Complete? /─408

YES → Report Completion, RF Performance, Location /─410

NO

Download Interrupted? /─412

NO

YES

Report Issue, RF Performance, Location /─414

END

Vehicle Condition Change? /─502

YES → Report Condition Change /─504

NO

600

ITERATIVE PRIORITIZED BACKGROUND DATA TRANSFER FOR VEHICLE OVER-THE-AIR UPDATES

TECHNICAL FIELD

Aspects of the present disclosure generally relate to iterative prioritized background data transfer for vehicle over-the-air (OTA) updates.

BACKGROUND

3GPP Release 15 has introduced a new service for background data transfer (BDT). BDT is a feature that enables a 3rd party service provider to schedule a data transfer during a time window to specific user equipment in a geographical are. BDT may allow for the data transfer to be performed during non-busy hours that are less expensive and able to handle larger bitrates.

SUMMARY

In one or more illustrative examples, a system for iterative prioritized background data transfer for vehicle OTA updates includes a cloud server, configured to send an OTA update over a communications network to a plurality of vehicles on a vehicle list. The cloud server performs operations including to, in a first iteration, initiate a background data transfer to send the OTA update over the communications network to the plurality of vehicles; receive delivery statuses for the OTA update from the plurality of vehicles, the delivery statuses indicating radio frequency (RF) status of the plurality of vehicles over the communications network, whether the OTA update is complete, and whether the vehicles are on or off; update the vehicle list to remove the vehicles with a completed OTA update based on the delivery status and to set a low priority to the vehicles having poor RF status; in a subsequent iteration, initiate a first background data transfer to send the OTA update to the vehicles on the vehicle list having high priority and then initiate a second background data transfer to send the OTA update to the vehicles on the vehicle list having the low priority; and repeat the receive, update, and subsequent iteration operations until all of the vehicles have received the OTA update.

In one or more illustrative examples, a method for iterative prioritized background data transfer for vehicle OTA updates includes in a first iteration, initiating a background data transfer sending an OTA update over a communications network to a plurality of vehicles; receiving delivery statuses for the OTA update from the plurality of vehicles, the delivery statuses indicating RF status of the plurality of vehicles over the communications network, whether the OTA update is complete, and whether the vehicles are on or off; updating a vehicle list to remove the vehicles with a completed OTA update based on the delivery statuses and to set a low priority to the vehicles having poor RF status; in a subsequent iteration, initiating a first background data transfer to send the OTA update to the vehicles on the vehicle list having high priority and then initiate a second background data transfer to send the OTA update to the vehicles on the vehicle list having the low priority; and repeating the receiving, updating, and subsequent iteration operations until all of the vehicles have received the OTA update.

In one or more illustrative examples, a non-transitory computer-readable medium includes instructions for vehicle OTA updates that, when executed by a cloud server, cause the cloud server to perform operations including to in a first iteration, initiate a background data transfer to send an OTA update over a communications network to a plurality of vehicles; receive delivery statuses for the OTA update from the plurality of vehicles, the delivery statuses indicating RF status of the plurality of vehicles over the communications network, whether the OTA update is complete, and whether the vehicles are on or off; updating a vehicle list to remove the vehicles with a completed OTA update based on the delivery statuses and to set a low priority to the vehicles having poor RF status; in a subsequent iteration, initiate a first background data transfer to send the OTA update to the vehicles on the vehicle list having high priority and then initiate a second background data transfer to send the OTA update to the vehicles on the vehicle list having the low priority; and repeat the receive, update, and subsequent iteration operations until all of the vehicles have received the OTA update.

BRIEF DESCRIPTION OF THE DRAWINGS

FIG. 3 illustrates an example process for the operation of the cloud server in performing the iterative prioritized background data transfer for applying OTA updates to the vehicles;

DETAILED DESCRIPTION

Figure 1:
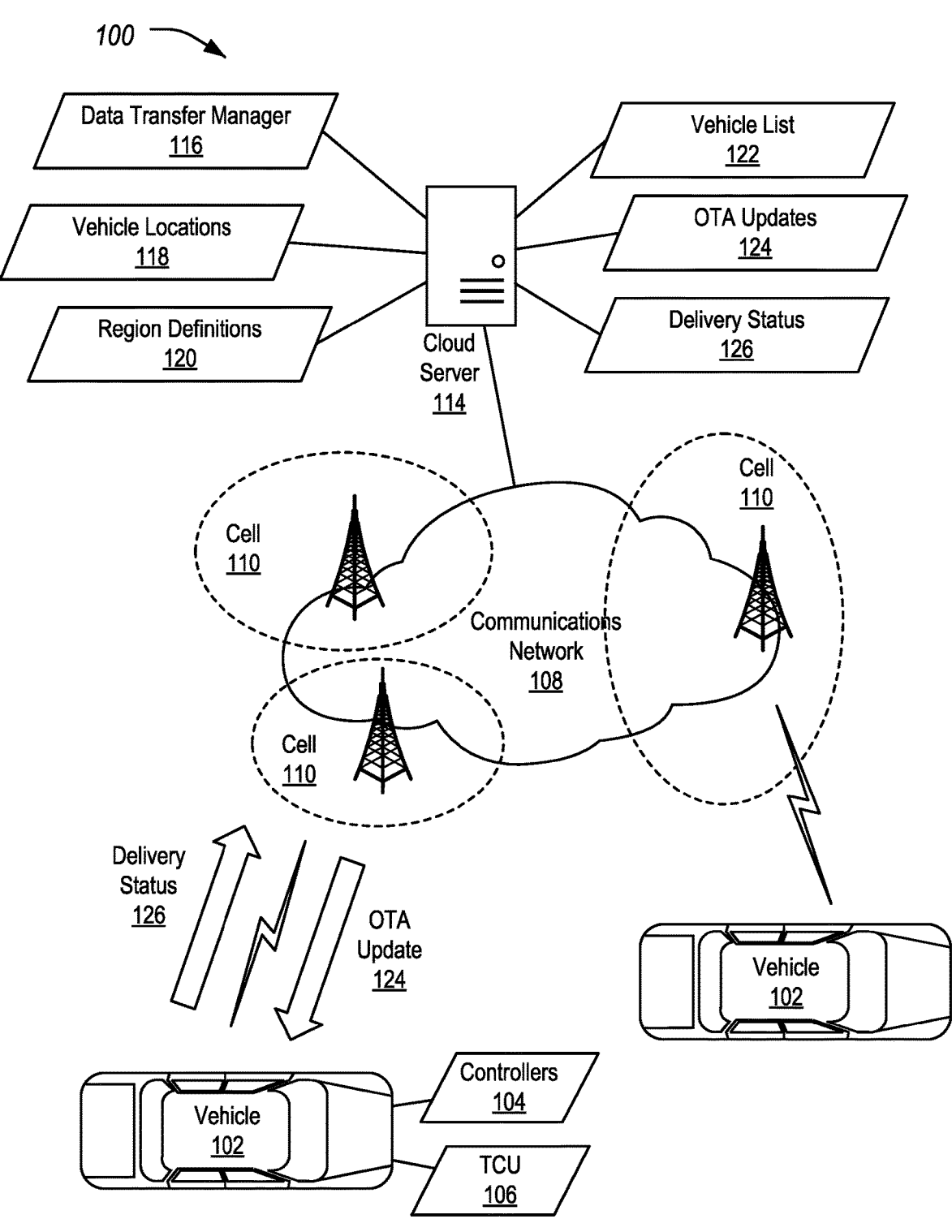
FIG. 1 illustrates an example system implementing iterative prioritized background data transfer for vehicle OTA updates.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

OTA updates may be pushed to vehicles in real-time over a communications network. In such a situation, the download occurs as requested, regardless of whether the communications network is busy. A BDT service provides for transfer of non-real-time data traffic, with the potential for lower spend and low priority. Using BDT, the cellular network may deliver the OTA data to vehicles in an area when the network load is low or otherwise off-peak.

This approach may be beneficial to both original equipment manufacturers (OEMs) and mobile network operators (MNOs), as OEMs may be able to incur less in data spend, while MNOs can maximize their network's usage and balance the network load. This may be particularly advantageous for OTA data, which is normally not time-critical and can be done within a time window (e.g. on the order of a couple of weeks).

In a BDT request, an OEM may specify a number of user equipment devices (e.g., vehicles in an example) in a network area, a data size of the data to transfer, and a desired time window. The MNO may then plan the data delivery and balance the network load. Yet, as vehicles do not remain stationary, such planning becomes complicated.

One approach to address vehicle movement may include to request the MNO to deliver an OTA update to a large number of vehicles in a large network area with large time window. The MNO may simply transfer the data to all the vehicles at the same time and retry if an issue occurs. A consequence of such an approach may be a higher chance of issues and re-attempts due to constraints of the vehicle status. As one example, an internal combustion engine (ICE) vehicle may be unable to wake up to process the receiving data for more than fifteen minutes at a time. Or the vehicle may be located at a position having poor RF characteristics. The MNO may perform repeated attempts to deliver the data to the vehicles one-by-one. But this may also be inefficient and ineffective.

An enhanced approach may include to perform iterative background data transfers, in combination with vehicle feedback reports for each transfer iteration. The approach may then prioritize vehicles for a next iteration, and eventually enhance overall OTA effectiveness.

In a first iteration, a server may attempt to send data to a region with low network load. This may include to transfer the data to all vehicles with the same priority in the region. Then, the server may collect vehicle feedback from the vehicles. This vehicle feedback may include information such as download speed, RF quality, vehicle location, result of the transfer (e.g., complete transfer, partial transfer, interrupted transfer, checksum error, unable to transfer, etc.).

The server may remove these vehicles having completed the OTA from the list. The server may also prioritize the rest of the vehicles by assigning a low priority to those vehicles with poor transfer performance. These vehicles may update the server if and when their conditions change (e.g., an ignition status change, a location change, etc.). The server may then reassign those vehicles to a high priority based on the change in condition.

The server may start a next iteration to the region with low network load. This iteration may include first attempting to transfer the data to those vehicles assigned to the high priority, and then attempting to transfer the data to the remaining vehicles assigned to the low priority.

The server may again remove these vehicles having completed the OTA from the list and continue the iterations. If the remaining vehicles volume falls is below a threshold quantity, the server may attempt to transfer the data without low network load restriction. Using such an approach, the system may deliver OTA updates more effectively.

FIG. 1 illustrates an example system 100 implementing iterative prioritized background data transfer for vehicle OTA updates. The system 100 includes a vehicle 102 having various controllers 104 and a telematics control unit (TCU) 106. The TCU 106 may allow the vehicle 102 to communicate with remote devices over a communications network 108 having various cells 110. In an example, this communication may include communication with a data transfer manager 116. It should be noted that the system 100 is only an example, and systems 100 having more, fewer, or different elements may be used. For example, while a vehicle 102 having a TCU 106 is shown, the disclosed approach may be applicable to other environments in which transfers over a communications network 108 may be used, such as a smartphone or smart speaker device.

The vehicle 102 may include various types of automobile, crossover utility vehicle (CUV), sport utility vehicle (SUV), truck, recreational vehicle (RV), boat, jeepney, plane or other mobile machine for transporting people or goods. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle powered by both an internal combustion engine and one or more electric motors, such as a series hybrid electric vehicle, a parallel hybrid electrical vehicle, or a parallel/series hybrid electric vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. Some vehicles 102 may be operator controlled, while other vehicles 102 may be autonomously or semi-autonomously controlled.

The vehicle 102 may include a plurality of controllers 104 configured to perform and manage various vehicle 102 functions under the power of the vehicle battery and/or drivetrain. As some non-limiting vehicle controller 104 examples: a powertrain controller 104 may be configured to provide control of engine operating components (e.g., idle control components, fuel delivery components, emissions control components, etc.) and for monitoring status of such engine operating components (e.g., status of engine codes); a body controller 104 may be configured to manage various power control functions such as exterior lighting, interior lighting, keyless entry, remote start, and point of access status verification (e.g., closure status of the hood, doors and/or trunk of the vehicle 102); a radio transceiver controller 104 may be configured to communicate with key fobs, mobile devices, or other local vehicle 102 devices; an autonomous controller 104 may be configured to provide commands to control the powertrain, steering, or other aspects of the vehicle 102; a climate control management controller 104 may be configured to provide control of heating and cooling system components (e.g., compressor clutch, blower fan, temperature sensors, etc.); a global navigation satellite system (GNSS) controller 104 may be configured to provide vehicle 102 location information; and a human-machine interface (HMI) controller 104 may be configured to receive user input via various buttons or other controls, as well as provide vehicle 102 status information to a driver, such as fuel level information, engine operating temperature information, and current location of the vehicle 102. The vehicle 102 may also be configured to power other devices external to the vehicle 102 using the vehicle 102 battery and/or drivetrain.

The vehicle 102 may include a TCU 106 configured to communicate over the communications network 108. The TCU 106 may include network hardware configured to facilitate communication between the controllers 104 and with other devices of the system 100. For example, the TCU 106 may include or otherwise access a cellular modem configured to facilitate communication with other vehicles 102 or with infrastructure. The TCU 106 may, accordingly, be configured to communicate over various protocols, such as with a communication network over a network protocol (such as Uu). The TCU 106 may, additionally, be configured to communicate over a broadcast peer-to-peer protocol (such as PC5), to facilitate cellular vehicle-to-everything (C-V2X) communications with devices such as other vehicles 102. It should be noted that these protocols are merely examples, and different peer-to-peer and/or cellular technologies may be used.

The TCU 106 may be configured to provide telematics services to the vehicle 102. These services may include, as some non-limiting possibilities, navigation, turn-by-turn directions, vehicle health reports, local business search, accident reporting, and hands-free calling. The TCU 106 may accordingly be configured to utilize a transceiver to communicate with a communications network 108.

The TCU 106 may include various types of computing apparatus in support of performance of the functions of the TCU 106 described herein. In an example, the TCU 106 may include one or more processors configured to execute computer instructions, and a storage medium on which the computer-executable instructions and/or data may be maintained. A computer-readable storage medium (also referred to as a processor-readable medium or storage) includes any non-transitory (e.g., tangible) medium that participates in providing data (e.g., instructions) that may be read by a computer (e.g., by the processor(s)). In general, the processor receives instructions and/or data, e.g., from the storage, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C #, Fortran, Pascal, Visual Basic, Python, JavaScript, Perl, etc.

A vehicle bus (not shown) may include various methods of communication available between the controllers 104, as well as between the TCU 106 and the vehicle controllers 104. As some non-limiting examples, a vehicle bus may include one or more of a controller area network (CAN), an Ethernet network, and a media-oriented system transfer (MOST) network.

The communications network 108 may include one or more cells 110 including networking and computing resources. In an example, the cells 110 may include antennas configured to wirelessly communicate with the wireless transceivers of the devices of the system 100. The communications network 108 may accordingly be distributed over land areas corresponding to different cells 110, where each cell 110 is served by at least one fixed-location transceiver.

The communications network 108 may provide communications services, such as packet-switched network services (e.g., Internet access, voice over internet protocol (VoIP) communication services), to devices connected to the communications network 108. For instance, the TCU 106 may access the communications network 108 via connection to one or more cellular towers. To facilitate the communications over the communications network 108, the TCU 106 may be associated with unique device identifiers (e.g., mobile device numbers (MDNs), Internet protocol (IP)

addresses, etc.) to identify the communications of the TCU 106 on the communications network 108 as being associated with the vehicle 102.

The cloud server 114 may be an example of a networked computing device that is accessible to the vehicle 102 over the communications network 108. A data transfer manager 116 may be an example of an application executed by the cloud server 114. The data transfer manager 116 may be configured to perform one or more of the operations discussed herein, e.g., with respect to the operation of the cloud server 114 for data transfer to and from the vehicles 102.

The cloud server 114 may maintain information about the vehicles 102. For cloud server 114, the cloud server 114 may receive from the communications network 108 information indicative of the quantity of vehicles 102 in a geographic area. In an example, the cloud server 114 may receive vehicle locations 118 from the communications network 108. This information may, for instance, be based on a home location database of the communications network 108 that maintains information indicative of which cells 110 are connected to the TCUs 106 of which vehicles 102. In another example, the vehicles 102 may report their locations to the cloud server 114, e.g., by using an GNSS controller 104 of the vehicle 102 to identify the vehicle location 118 and sending that information by the TCU 106 over the communications network 108 to the cloud server 114.

The cloud server 114 may generate a region definition 120 indicating a geographic area based on various factors. For example, these factors may include quantity of vehicles 102, model of vehicles 102, and network coverage of the communications network 108. A region definition 120 may be defined as a network region or a municipal region. For a network region, this may include one or more cells 110 that provide cellular network base station coverage, and/or coverage using a cloud server 114. For a municipal region, thus may include a metropolitan area, a rural area other than a metropolitan area, a state, or even multiple states. In some cases, an OTA update 124 may be designed for vehicles 102 in a region, and the region definition 120 may be defined to enclose the region within which an OTA update 124 is intended to be installed.

The cloud server 114 may define a vehicle list 122 of the vehicles 102 that are to receive an OTA update 124 in a region defined by the region definition 120. The vehicle list 122 may include a listing of the vehicle 102 that are indicated, by the communications network 108, as being located within the region definition 120. The vehicles 102 may be indicated on the vehicle lists 122 by any of various vehicle identifiers, such as vehicle identification number (VIN) defined by the International Organization for Standardization (ISO) 3779 and ISO 4030, media access control (MAC) address, etc.

The OTA updates 124 may include any of various software updates and/or configuration updates that are to be applied to the TCU 106 and/or other controllers 104 of the vehicle 102. In some cases, the OTA update 124 may add additional features to the vehicle 102. In other cases, the OTA update 124 may include bugfixes or other updates to enhance the operation of existing features of the vehicle 102. In some examples, the OTA update 124 may be designed for use with specific make or model of vehicle 102, and/or for a specific model and/or version of controller 104 (or controllers 104) within the vehicle 102. In some cases, the OTA update 124 may include or otherwise be associated with a severity, e.g., whether the update should be installed immediately, or if the update may be installed over time in a background manner (e.g., through use of BDT via the data transfer manager 116).

The cloud server 114 may maintain the OTA update 124 for the vehicles 102 in storage of the cloud server 114. It should be noted that different model of vehicles 102 may have different packages which may be of different sizes stored by the cloud server 114. The cloud server 114 may calculate the total OTA data volume for all these vehicles 102, e.g., collectively for two thousand vehicles 102. In some cases, this data quantity may be used for determining which approach to use for transferring the OTA update 124, as opposed to a count of the vehicles 102 themselves.

The cloud server 114 may also maintain delivery status 126 information with respect to the progress in sending the OTA update 124 to the vehicles 102 on the vehicle list 122. The delivery status 126 may include information such as a result of the OTA update 124 (e.g., complete transfer, partial transfer, interrupted transfer, checksum error, unable to transfer, etc.), a location of the vehicle 102, whether the vehicle 102 has moved, whether the vehicle 102 is ON or OFF, download speed to the vehicle 102, RF signal parameters as measured for the vehicle 102, etc.

In an example, the TCU 106 of the vehicle 102 may send a delivery status 126 to the cloud server 114 responsive to receiving an OTA update 124 from the cloud server 114. In another example, the TCU 106 of the vehicle 102 may send an update of delivery status 126 based on a change in ignition ON/OFF and/or for other events such as a change in vehicle 102 location.

The delivery status 126 information maintained by the cloud server 114 may accordingly include historical status data received from the vehicles 102. The cloud server 114 may, in some examples, use this information to update the quantity of vehicles 102 in a region definition 120, e.g., a quantity with a given ON/OFF status during a certain time (e.g., 7 am-9 am, 10 pm-2 am, 4 pm-6 pm, etc.).

Figure 2:
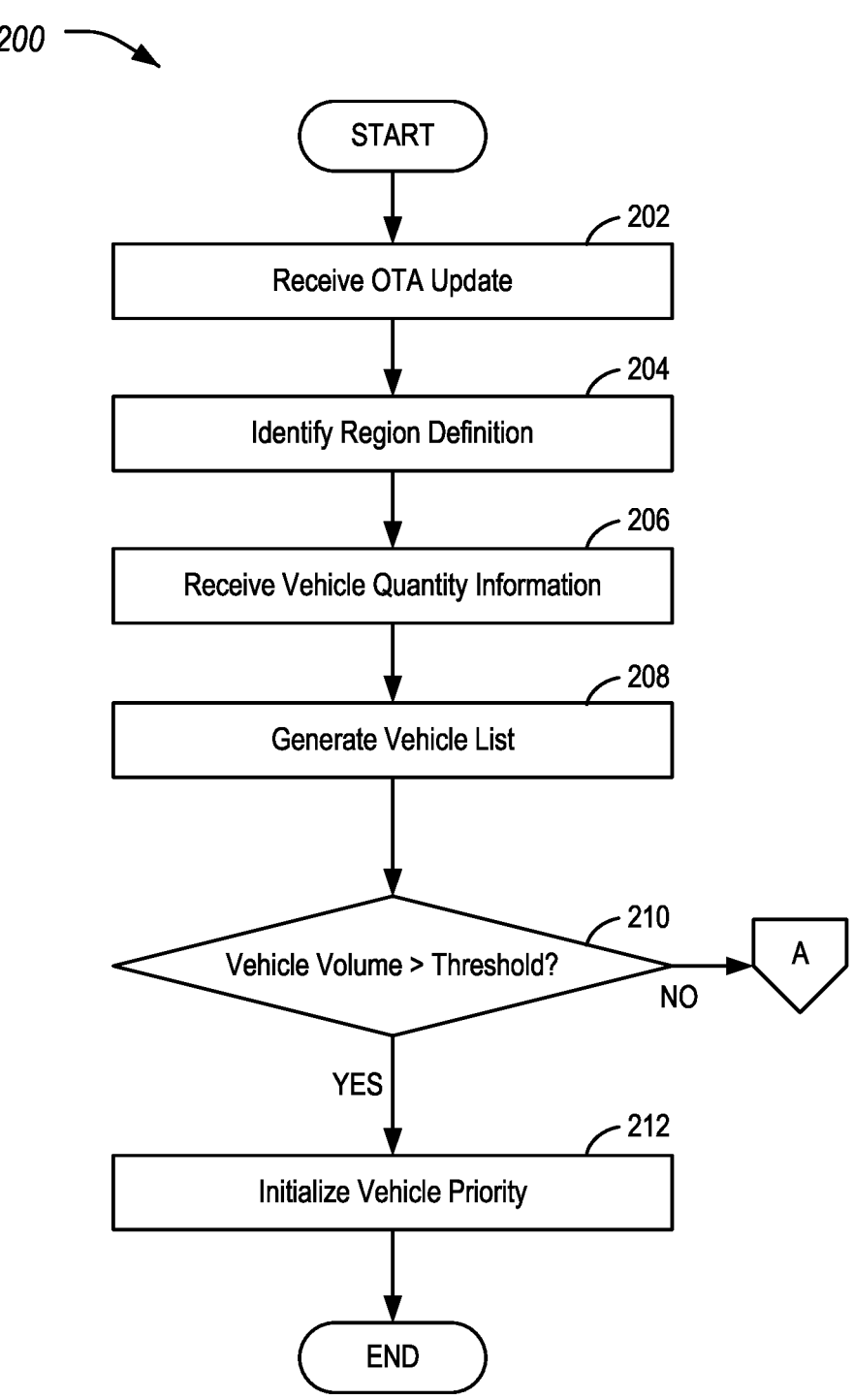
FIG. 2 illustrates an example process for the operation of the cloud server in initiating an iterative prioritized background data transfer for applying OTA updates to the vehicles.

FIG. 2 illustrates an example process 200 for the operation of the cloud server 114 in initiating an iterative prioritized background data transfer for applying OTA updates 124 to the vehicles 102. In an example, the process 200 may be performed by the data transfer manager 116 executed by the cloud server 114 in the context of the system 100.

At operation 202, the cloud server 114 receives an OTA update 124. This OTA update 124 may be intended for dissemination to the vehicles 102. In an example, the OTA update 124 may indicate aspects of the vehicles 102 for which the OTA update 124 is intended, as well as whether the OTA update 124 may be installed using the Data transfer manager 116. For purposes of the process 200, it is assumed that the OTA update 124 is a software update or a configuration update that is installable to the vehicle 102 using the Data transfer manager 116.

At operation 204, the cloud server 114 identifies a region definition 120. In an example the cloud server 114 may maintain region definitions 120 for different areas for the delivery of OTA updates 124. A region definition 120 may be defined as a network region or a municipal region. For a network region, this may include one or more cells 110 that provide cellular network base station coverage, and/or coverage using a cloud server 114. For a municipal region, thus may include a metropolitan area, a rural area other than a metropolitan area, a state, or even multiple states.

At operation 206, the cloud server 114 receives vehicle 102 quantity information. In an example, the cloud server 114 receives, from the communications network 108, information indicative of the quantity of vehicles 102 in the cells 110 within the region definition 120. This information may, for example, be based on a home location database of the communications network 108 that maintains information indicative of which cells 110 are connected to the TCUs 106 of which vehicles 102. In another example, the vehicles 102 may report their locations to the cloud server 114, e.g., by using an GNSS controller 104 of the vehicle 102 to identify the vehicle location 118 and sending that information by the TCU 106 over the communications network 108 to the cloud server 114. In yet another examples, the total bytes of data to install the OTA update 124 to the vehicles 102 may be used as the quantity information.

At operation 208, the cloud server 114 generates a vehicle list 122 of the vehicles 102 meeting the region definition 120 to receive the OTA update 124. This may include the vehicles 102 notes at operation 206 as being within the region. In examples where the cloud server 114 has delivery status 126 information for the vehicles 102, the cloud server 114 may make use of this information when generating the vehicle list 122. For instance, the cloud server 114 may choose to perform OTA update 124 to vehicles with ON status only, or both ON and OFF status. When a vehicle 102 with status OFF is selected for OTA update 124, the cloud server 114 may choose to do partial data transfer (or only transfer OTA updates 124 of high severity) to prevent the TCU 106 staying on for long time and draining the battery of the vehicle 102.

At operation 210, the cloud server 114 determines whether the quantity exceeds a predefined volume threshold. In an example, if the count of the vehicles 102 on the vehicle list 122 (or the quantity of data) exceeds a predefined quantity (e.g., ten, one hundred, one thousand, etc.), then the background data transfer may be utilized and continue to operation 212.

At operation 212, the cloud server 114 initializes the priority of the vehicles 102 on the vehicle list 122. At the outset, the cloud server 114 may assigns a same priority for all vehicles 102. In a simple example, the cloud server 114 may make use of two priorities: a high priority and a low priority, where the high priority is attempted first before the low priority. Continuing with such an example, the cloud server 114 may initialize all the vehicles 102 on the vehicle list 122 to be set to the high priority. In other examples, more than two priorities may be used, and may, for example, be attempted in order from highest priority to lowest. After operation 212, the process 200 ends.

If, at operation 210, the quantity of vehicles 102 does not exceed the predefined volume threshold, the cloud server 114 may instead perform the OTA update 124 without regard to the priority of the vehicle 102. In an example the process 200 may continue to reference (A) as shown in the process 300 below.

FIG. 3 illustrates an example process 300 for the operation of the cloud server 114 in performing the iterative prioritized background data transfer for applying OTA updates 124 to the vehicles 102. In an example, as with the process 200, the process 300 may be performed by the Data transfer manager 116 executed by the cloud server 114 in the context of the system 100.

At operation 302, the cloud server 114 initializes a background data transfer. Further aspects of this operation are discussed above with respect to the process 200.

At operation 304, the cloud server 114 identifies network load on the communications network 108. In an example, the cloud server 114 may query the communications network 108 for the network busy level, amount of network congestion, packet loss, and/or other network or QoS parameters for the cells 110 of the communications network 108 that are within the region definition 120 for the OTA update 124. The cloud server 114 may thus monitor or be informed about the network load in the defined region. The cloud server 114 may accordingly estimate the total OTA data volume against the network load to determine if the network load is low enough to be suitable to start background data transfer for these vehicles 102.

At operation 306, the cloud server 114 determines whether the network load is sufficiently low to allow for performance of the background data transmission. If not, control proceeds to operation 308 to wait an additional interval of time. This wait may allow the cloud server 114 to perform a back off until network usage decreases. This interval of time may be a predefined constant period of time, or may be a randomized period of time. If network load is sufficiently low to allow for the background data transmission, control proceeds to operation 310.

At operation 310, the cloud server 114 attempts to transfer the OTA update 124 to the high priority vehicles 102. In an example, the cloud server 114 may utilize the Data transfer manager 116 to perform a background data transfer of the OTA update 124 to the vehicles 102 that are indicated, on the vehicle list 122, as being of high priority. For example, the cloud servers 114 may schedule a background data transfer of the OTA update 124 to the vehicles 102 on the vehicle list 122, for a time window (such as the next four hours, next eight hours, etc.).

At operation 312, the cloud server 114 attempts to transfer the OTA update 124 to the low priority vehicles 102. In an example, after operation 310, the cloud server 114 may then utilize the Data transfer manager 116 to perform a background data transfer of the OTA update 124 to the vehicles 102 that are indicated, on the vehicle list 122, as being of low priority. It should be noted that in instances where there are more than two priorities, the operations 310, 312 may be performed iteratively from highest to lowest priority.

At operation 314, the cloud server 114 receives delivery statuses 126 from the vehicles 102. These delivery statuses 126 may be received by the cloud server 114 over the communications network 108 as sent from the TCUs 106 of the vehicles 102. The delivery status 126 may include information such as a result of the OTA update 124 (e.g., complete transfer, partial transfer, interrupted transfer, checksum error, unable to transfer, etc.), a location of the vehicle 102, whether the vehicle 102 has moved, whether the vehicles is ON or OFF, download speed, RF quality, etc.

At operation 316, the cloud server 114 removes completed vehicles 102 from the vehicle list 122. This may be based, for example, on the delivery status 126 messages as received at operation 316.

At operation 318, the cloud server 114 determines whether there are still sufficient vehicles 102 on the vehicle list 122 to continue the background data transfer of the OTA update 124 to the vehicles 102. In an example, if the count of the vehicles 102 on the vehicle list 122 exceeds the predefined quantity used at operation 210, then the background data transfer may be utilized and continue to operation 320. Or, in other examples, the if the count of the vehicles 102 on the vehicle list 122 exceeds a different predefined quantity (e.g., fewer vehicles 102 than used to initiate the background data transfer, any vehicles 102 remaining on the vehicle list 122, etc.)

At operation 320, the cloud server 114 assigns low priority to vehicles 102 on the vehicle list 122 that indicate poor RF performance. This may be based, for example, on the delivery status 126 messages as received at operation

316. For example, if a vehicle 102 has a transfer speed below a predefined minimum, or if packet loss, signal strength, or other QoS measures indicate poor connectivity for the vehicle 102, the vehicle list 122 may be updated for that vehicle 102 to be low priority.

At operation 322, the cloud server 114 assigns high priority to vehicles 102 on the vehicle list 122 that indicate a condition change. This may be based, for example, on the delivery status 126 messages as received at operation 316. For example, if a vehicle 102 indicates it is at a different location or if its ignition status changed from OFF to ON, then the cloud server 114 may reset that vehicle 102 on the vehicle list 122 to again be high priority.

After operation 322, the cloud server 114 returns to operation 304. It should be noted that the priority for vehicles 102 that did not report poor RF performance or that did not report a condition change may be left unchanged on the vehicle list 122.

At operation 324, the cloud server 114 performs the OTA update 124 without using background data transfer. This may be performed in situations where the quantity of vehicles 102 on the vehicle list 122 is low enough that the cloud server 114 determines that the complexity of using the background data transfer approach is no longer required. After operation 324, the process 300 ends.

Figures 4, 5:
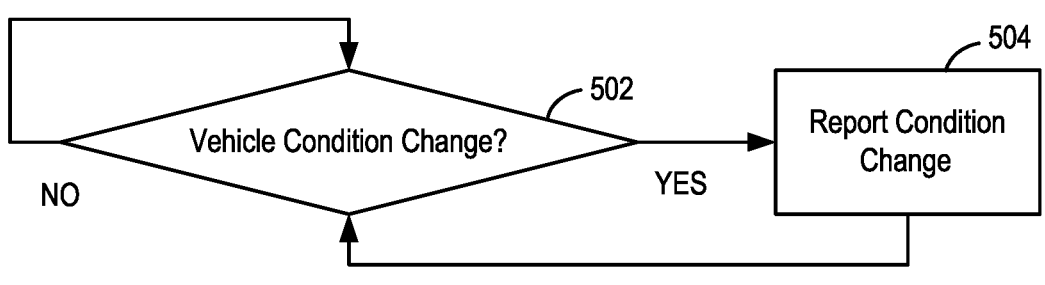
FIG. 4 illustrates an example process for the operation of the vehicles in performing the iterative prioritized background data transfer for applying OTA updates to the vehicles.
FIG. 5 illustrates an example process for the operation of the vehicles in indicating condition changes to the cloud server.

FIG. 4 illustrates an example process 400 for the operation of the vehicles 102 in performing the iterative prioritized background data transfer for applying OTA updates 124 to the vehicles 102. In an example, the process 400 may be performed by the TCU 106 of the vehicle 102 in communication with the cloud server 114 in the context of the system 100.

At operation 402, the vehicle 102 attempts to perform an OTA update 124. In an example, the vehicle 102 may receive the OTA update 124 in accordance with operations 310-312 of the process 300. The vehicle 102 may accordingly attempt to download the OTA update 124 over its connection to the cell 110 of the communications network 108.

At operation 404, the vehicle 102 determines whether the download speed is below a minimum threshold. In an example, while monitoring the download of the OTA update 124 initiated at operation 402, the vehicle 102 may determine a download speed for the transfer. If this download speed is below the minimum threshold, control passes to operation 406. If not, control proceeds to operation 408.

At operation 406, the vehicle 102 sends a delivery status 126 indicating the poor network conditions. This delivery status 126 may additionally indicate the vehicle location 118 and that the OTA update 124 was terminated. After operation 406, the process 400 ends.

At operation 408, the vehicle 102 determines whether the download is complete. In an example, the download of the OTA update 124 initiated at operation 402 may complete. If so control proceeds to operation 410.

At operation 410, the vehicle 102 sends a delivery status 126 indicating completion of the OTA update 124 download. This delivery status 126 may additionally indicate the vehicle location 118 and that the OTA update 124 was terminated. After operation 410, the process 400 ends.

At operation 412, the vehicle 102 determines whether the download has been interrupted. In an example, the download of the OTA update 124 initiated at operation 402 may timeout or otherwise not complete for various network or other reasons. If so control proceeds to operation 414. If not, control returns to operation 404.

At operation 414, the vehicle 102 sends a delivery status 126 indicating an incomplete download of the OTA update

124. This delivery status 126 may additionally indicate the vehicle location 118 and the RF conditions. After operation 414, the process 400 ends.

FIG. 5 illustrates an example process 500 for the operation of the vehicles 102 in indicating condition changes to the cloud server 114. In an example, as with the process 400 the process 500 may be performed by the TCU 106 of the vehicle 102 in communication with the cloud server 114 in the context of the system 100.

At operation 502, the vehicle 102 determines whether a condition change has occurred for the vehicle 102. In an example, the vehicle 102 may change its location. In another example, the vehicle 102 may change from an OFF ignition status to an ON ignition status. If so, control proceeds to operation 504. If not, control remains at operation 502.

At operation 504, the vehicle 102 sends a delivery status 126 to the cloud server 114 indicating the condition change. This delivery status 126 may additionally indicate the vehicle location 118 and the RF conditions. After operation 504, control returns to operation 502.

Thus, an iterative and prioritized data transfer with delivery status 126 updates may be used to enhance overall effectiveness of a background data transfer approach to applying OTA updates 124. The system 100 may deprioritize vehicles 102 with connectivity issues, and reprioritize vehicles 102 with changed vehicle condition.

Variations on the disclosed approach are possible. In an example, the cloud server 114 may record, for a region definition 120, locations within the region definition 120 having historically successful OTA transfers of the OTA updates 124 to the vehicles 102 over the communications network 108. In some examples, the cloud server 114 may filter these locations to exclude private network connection locations, such as locations that are private residences. Regardless, the cloud server 114 may indicate these locations where successful transfers have occurred to the vehicles 102 on the vehicle list 122 (e.g., via short message service (SMS), or using another mechanism requiring low data rate connectivity).

In some examples, the cloud server 114 may send a suggestion to the owner's mobile device to indicate those locations to the user in that manner. In another example, the cloud server 114 may send the suggested locations to the vehicle 102, such that the vehicle 102 may provide a notification to indicate to move the vehicle 102 to one of those locations (e.g., responsive to entering or starting the vehicle 102). In such an example, responsive to the vehicle 102 moving to one of the good locations, the vehicle 102 may trigger a delivery status 126 report and may send the delivery status 126 to the cloud server 114 so that the cloud server 114 may proceed to send the OTA update 124.

Figure 6:
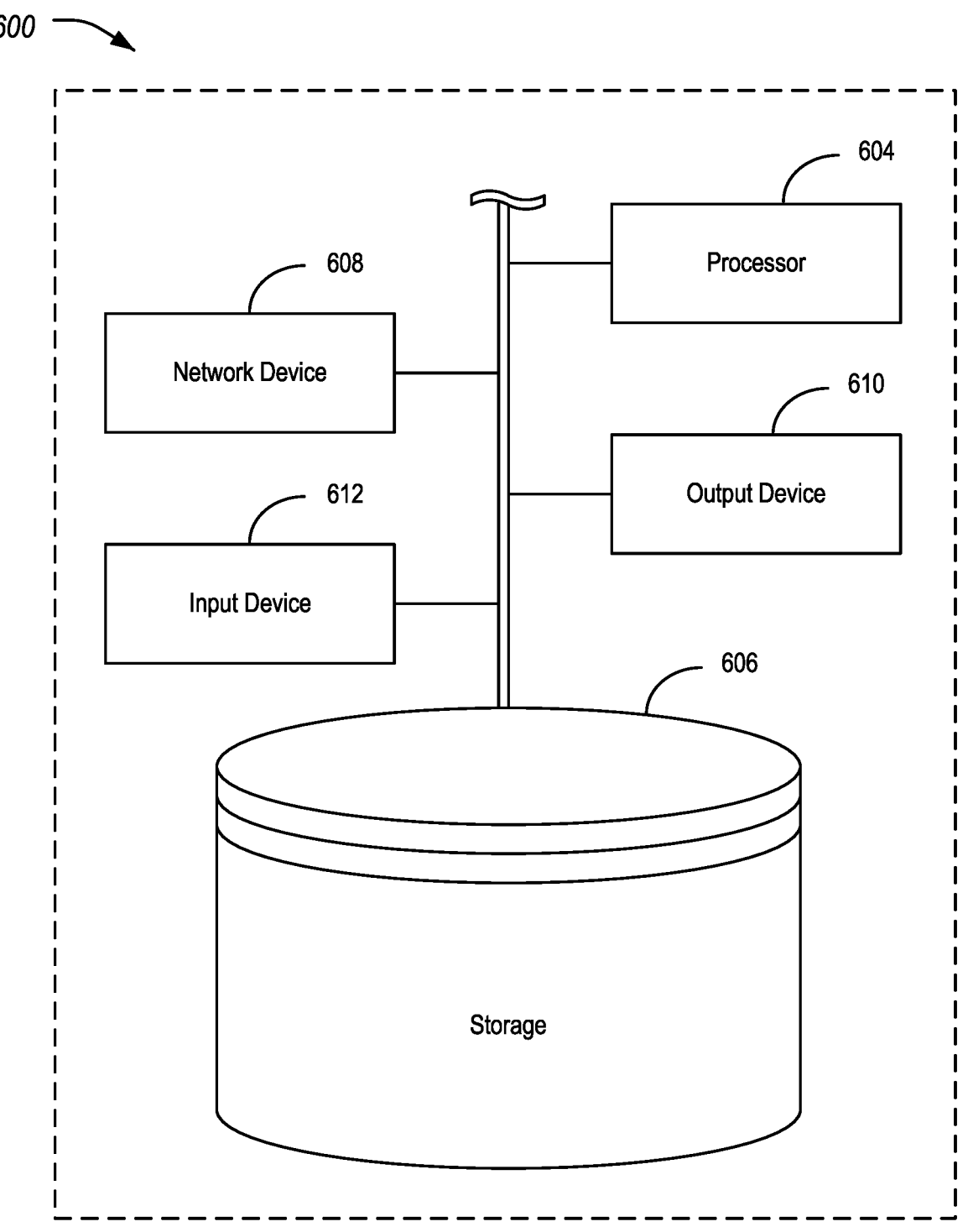
FIG. 6 illustrates an example of a computing device for use in implementing aspects of the intelligent virtual assistant selection service.

FIG. 6 illustrates an example 600 of a computing device 602 for use in implementing aspects of the iterative prioritized background data transfer for OTA updates 124 to vehicles 102. Referring to FIG. 6, and with reference to FIGS. 1-5, the vehicles 102, controllers 104, TCU 106, communications network 108, cells 110, and cloud server 114 may be examples of such computing devices 602. As shown, the computing device 602 may include a processor 604 that is operatively connected to a storage 606, a network device 608, an output device 610, and an input device 612. It should be noted that this is merely an example, and computing devices 602 with more, fewer, or different components may be used.

The processor 604 may include one or more integrated circuits that implement the functionality of a central processing unit (CPU) and/or graphics processing unit (GPU).

In some examples, the processors 604 are a system on a chip (SoC) that integrates the functionality of the CPU and GPU. The SoC may optionally include other components such as, for example, the storage 606 and the network device 608 into a single integrated device. In other examples, the CPU and GPU are connected to each other via a peripheral connection device such as peripheral component interconnect (PCI) express or another suitable peripheral data connection. In one example, the CPU is a commercially available central processing device that implements an instruction set such as one of the x86, ARM, Power, or microprocessor without interlocked pipeline stages (MIPS) instruction set families.

Regardless of the specifics, during operation the processor 604 executes stored program instructions that are retrieved from the storage 606. The stored program instructions, such as those of the Data transfer manager 116 and data transfer manager 116, include software that controls the operation of the processors 604 to perform the operations described herein. The storage 606 may include both non-volatile memory and volatile memory devices. The non-volatile memory includes solid-state memories, such as not AND (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system 100. This data may include, as non-limiting examples, the region definitions 120, OTA updates 124, and delivery statuses 126.

The GPU may include hardware and software for display of at least two-dimensional (2D) and optionally three-dimensional (3D) graphics to the output device 610. The output device 610 may include a graphical or visual display device, such as an electronic display screen, projector, printer, or any other suitable device that reproduces a graphical display. As another example, the output device 610 may include an audio device, such as a loudspeaker or headphone. As yet a further example, the output device 610 may include a tactile device, such as a mechanically raiseable device that may, in an example, be configured to display braille or another physical output that may be touched to provide information to a user.

The input device 612 may include any of various devices that enable the computing device 602 to receive control input from users. Examples of suitable input devices 612 that receive human interface inputs may include keyboards, mice, trackballs, touchscreens, voice input devices, graphics tablets, and the like.

The network devices 608 may each include any of various devices that enable the devices discussed herein to send and/or receive data from external devices over networks. Examples of suitable network devices 608 include an Ethernet interface, a Wi-Fi transceiver, a Li-Fi transceiver, a cellular transceiver, or a BLUETOOTH or BLUETOOTH low energy (BLE) transceiver, or other network adapter or peripheral interconnection device that receives data from another computer or external data storage device, which can be useful for receiving large sets of data in an efficient manner.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, case of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for iterative prioritized background data transfer for vehicle over-the-air (OTA) updates, comprising:
a cloud server, configured to send an OTA update over a communications network to a plurality of vehicles on a vehicle list by performing operations including to:
in a first iteration, initiate a background data transfer to send the OTA update over the communications network to the plurality of vehicles;
receive delivery statuses for the OTA update from the plurality of vehicles, the delivery statuses indicating radio frequency (RF) status of the plurality of vehicles over the communications network, whether the OTA update is complete, and whether the vehicles are on or off;
update the vehicle list to remove the vehicles with a completed OTA update based on the delivery statuses and to set a low priority to the vehicles having poor RF status;
in a subsequent iteration, initiate a first background data transfer to send the OTA update to the vehicles on the vehicle list having high priority and then initiate a second background data transfer to send the OTA update to the vehicles on the vehicle list having the low priority; and
repeat the receive, update, and subsequent iteration operations until all of the vehicles have received the OTA update.

2. The system of claim 1, wherein the cloud server is further configured to:
receive a condition change message from one of the vehicles, the condition change message indicating that, since the one of the vehicles has sent the delivery status to the cloud server, one or more of that the one of the vehicles has moved its location or that the RF status of the one of the vehicles has changed; and
update the vehicle list to set the one of the vehicles to the high priority.

3. The system of claim 1, wherein the cloud server is further configured to:
receive network load information from the communications network; and
initiate the operations to send the OTA update responsive to the network load information indicating that the communications network has network load below a predefined threshold, and otherwise perform a wait operation, wherein the cloud server iteratively performs the receive, initiate and wait operations until the OTA update is initiated.

4. The system of claim 1, wherein the cloud server is further configured to:
receive network load information from the communications network; and
initiate the subsequent iteration responsive operations, responsive to the network load information indicating that the communications network has network load below a predefined threshold, and otherwise perform a wait operation before reattempting to receive the network load information and initiate the subsequent iteration.

5. The system of claim 1, wherein the cloud server is further configured to:
responsive to a quantity of vehicles on the vehicle list being below a minimum threshold, send the OTA update to all the vehicles on the vehicle list, regardless of network load.

6. The system of claim 5, wherein to send the OTA update to all the vehicles on the vehicle list, regardless of network load, includes to send the OTA update to the vehicles in random order.

7. The system of claim 1, wherein the cloud server is further configured to abandon the send of the OTA update responsive to expiration of a predefined time period for sending the OTA update.

8. The system of claim 1, wherein the cloud server is further configured to:
receive vehicle location information; and
generate the vehicle list to include those vehicles within a region defined by a region definition stored to the cloud server, the region definition indicating one or more cells of the communications network in which the vehicles are located for receiving the OTA update.

9. The system of claim 8, wherein the cloud server is further configured to initiate the send of the OTA update responsive to a quantity of vehicles identified for the vehicle list reaching at least a predefining quantity of vehicles.

10. The system of claim 8, wherein the cloud server is further configured to:
identify a location within the region definition having historically successful OTA transfers of the OTA update; and
indicate the location to the vehicles as a suggested location for receiving the OTA update.

11. The system of claim 10, wherein the cloud server is further configured to receive a delivery status report from one of the vehicles, responsive to the one vehicle moving to the location, to indicate that the vehicle is in position to receive the OTA update.

12. A method for iterative prioritized background data transfer for vehicle over-the-air (OTA) updates, comprising:
in a first iteration, initiating a background data transfer to send an OTA update over a communications network to a plurality of vehicles;
receiving delivery statuses for the OTA update from the plurality of vehicles, the delivery statuses indicating radio frequency (RF) status of the plurality of vehicles over the communications network, whether the OTA update is complete, and whether the vehicles are on or off;
updating a vehicle list to remove the vehicles with a completed OTA update based on the delivery statuses and to set a low priority to the vehicles having poor RF status;

in a subsequent iteration, initiating a first background data transfer to send the OTA update to the vehicles on the vehicle list having high priority and then initiate a second background data transfer to send the OTA update to the vehicles on the vehicle list having the low priority; and repeating the receiving, updating, and subsequent iteration operations until all of the vehicles have received the OTA update.

13. The method of claim 12, further comprising:

receiving a condition change message from one of the vehicles, the condition change message indicating that, since the one of the vehicles has sent the delivery status to the cloud server, one or more of that the one of the vehicles has moved its location or that the RF status of the one of the vehicles has changed; and updating the vehicle list to set the one of the vehicles to the high priority.

14. The method of claim 12, further comprising:

receiving network load information from the communications network;

initiating the operations to send the OTA update responsive to the network load information indicating that the communications network has network load below a predefined threshold, and otherwise perform a wait operation; and iteratively performing the receiving, initiating and waiting operations until the OTA update is initiated.

15. The method of claim 12, further comprising:

receiving network load information from the communications network; and initiating the subsequent iteration responsive operations, responsive to the network load information indicating that the communications network has network load below a predefined threshold, and otherwise perform a wait operation before reattempting to receive the network load information and initiate the subsequent iteration.

16. The method of claim 12, further comprising responsive to a quantity of vehicles on the vehicle list being below a minimum threshold, sending the OTA update to all the vehicles on the vehicle list, regardless of network load.

17. The method of claim 16, wherein sending the OTA update to all the vehicles on the vehicle list, regardless of network load, includes sending the OTA update to the vehicles in random order.

18. The method of claim 12, further comprising abandoning the send of the OTA update responsive to expiration of a predefined time period for sending the OTA update.

19. The method of claim 12, further comprising:

receiving vehicle location information; and generating the vehicle list to include the vehicles within a region defined by a region definition, the region definition indicating one or more cells of the communications network in which the vehicles are located for receiving the OTA update.

20. The method of claim 19, further comprising initiating the send of the OTA update responsive to a quantity of vehicles identified for the vehicle list reaching at least a predefining quantity of vehicles.

21. The method of claim 19, further comprising:

identifying a location within the region definition having historically successful OTA transfers of the OTA update; and indicating the location to the vehicles as a suggested location for receiving the OTA update.

22. The method of claim 21, further comprising receiving a delivery status report from one of the vehicles, responsive to the one vehicle moving to the location, to indicate that the vehicle is in position to receive the OTA update.

23. A non-transitory computer-readable medium comprising instructions for vehicle over-the-air (OTA) updates that, when executed by a cloud server, cause the cloud server to perform operations including to:

in a first iteration, initiate a background data transfer to send an OTA update over a communications network to a plurality of vehicles;

receive delivery statuses for the OTA update from the plurality of vehicles, the delivery statuses indicating radio frequency (RF) status of the plurality of vehicles over the communications network, whether the OTA update is complete, and whether the vehicles are on or off;

updating a vehicle list to remove the vehicles with a completed OTA update based on the delivery statuses and to set a low priority to the vehicles having poor RF status;

in a subsequent iteration, initiate a first background data transfer to send the OTA update to the vehicles on the vehicle list having high priority and then initiate a second background data transfer to send the OTA update to the vehicles on the vehicle list having the low priority; and repeat the receive, update, and subsequent iteration operations until all of the vehicles have received the OTA update.

24. The system of claim 1, wherein the RF status includes one or more QoS measures indicative of network connectivity for the vehicle.

25. The system of claim 24, wherein the QoS measures include measures of network busy level, amount of network congestion, and/or packet loss.

* * * * *